(12) United States Patent
Kistner et al.

(10) Patent No.: US 9,650,926 B2
(45) Date of Patent: May 16, 2017

(54) BREATHER DEVICE

(71) Applicant: Ingersoll-Rand Company, Davidson, NC (US)

(72) Inventors: Daniel Kistner, Munster (DE); Frank Banaszak, Recklinghausen (DE)

(73) Assignee: Ingersoll-Rand Company, Davidson, NC (US)

( * ) Notice: Subject to any disclaimer, the term of this patent is extended or adjusted under 35 U.S.C. 154(b) by 904 days.

(21) Appl. No.: 14/027,172

(22) Filed: Sep. 14, 2013

(65) Prior Publication Data
US 2014/0076267 A1 Mar. 20, 2014

Related U.S. Application Data

(60) Provisional application No. 61/701,268, filed on Sep. 14, 2012.

(51) Int. Cl.
*F01M 11/10* (2006.01)
*F16H 57/027* (2012.01)
*F01M 13/04* (2006.01)
*F16N 19/00* (2006.01)

(52) U.S. Cl.
CPC .......... *F01M 11/10* (2013.01); *F16H 57/027* (2013.01); *F01M 13/0405* (2013.01); *F16N 19/00* (2013.01)

(58) Field of Classification Search
CPC .. F01M 11/10; F01M 13/0405; F16H 57/027; F16N 19/00
See application file for complete search history.

(56) References Cited

U.S. PATENT DOCUMENTS

| | | | |
|---|---|---|---|
| 1,974,974 A | 9/1934 | Puffer | |
| 2,329,078 A | 9/1943 | O'Daniel | |
| 2,883,880 A | 4/1959 | Merkle | |
| 2,933,102 A | 9/1960 | Hillman et al. | |
| 3,866,789 A | 2/1975 | Lambert | |
| 3,916,724 A | 11/1975 | Muller et al. | |
| 4,351,203 A | 9/1982 | Fukunaga | |
| 4,506,562 A | 3/1985 | Yamaura et al. | |
| 4,595,118 A | 6/1986 | Azuma et al. | |
| 4,893,039 A | 1/1990 | Isii | |
| 6,015,444 A | 1/2000 | Craft et al. | |
| 6,335,580 B1 | 1/2002 | Cognigni et al. | |
| 6,447,565 B1 | 9/2002 | Raszkowski et al. | |
| 7,669,586 B2 | 3/2010 | Prior | |
| 8,028,524 B2 | 10/2011 | Middlebrook et al. | |
| 2004/0195044 A1* | 10/2004 | Kimura | F16H 57/027 184/6.23 |
| 2008/0207110 A1* | 8/2008 | Guichaoua | F16H 57/027 454/237 |
| 2012/0003915 A1 | 1/2012 | Sinha | |

FOREIGN PATENT DOCUMENTS

| | | | |
|---|---|---|---|
| DE | 2838395 B1 | 7/1979 | |
| DE | 10321211 A1 * | 12/2004 | .......... F01M 13/022 |
| JP | 2001090816 A | 4/2001 | |

OTHER PUBLICATIONS

International Search Report and Written Opinion; International PCT Application No. PCT/US2013/059838; Feb. 19, 2014; 8 pages.

\* cited by examiner

*Primary Examiner* — Hung Q Nguyen
(74) *Attorney, Agent, or Firm* — Taft Stettinius & Hollister LLP

(57) ABSTRACT

A working fluid case includes a housing and a breather device. The breather device includes a vent passage located in a recess formed in the housing.

20 Claims, 2 Drawing Sheets

BREATHER DEVICE

CROSS REFERENCE TO RELATED APPLICATIONS

The present application claims benefit of U.S. Provisional Patent Application No. 61/701,268 filed Sep. 14, 2012, entitled BREATHER DEVICE, which is incorporated herein by reference.

TECHNICAL FIELD

The present application relates to breather devices and more particularly, but not exclusively, to breather devices having provision for reducing ingress of foreign fluids or particles.

BACKGROUND

Breather devices are used in a variety of applications. For example, in truck blowers, a breather device is provided in the oil fill cap to cover the oil fill passage and prevent pressure build-up in the oil tank, gear housing, or the like due to increase in temperature therein. The breather device discharges gas that has accumulated in the oil tank or the like. Some applications may experience an environment in which the breather device is exposed to external high pressure foreign fluids. For example, in the case of truck blowers, foreign fluids such as high pressure cleaners are used for cleaning the blower.

Accordingly, there is a need for the unique and inventive breather device disclosed herein to reduce the possibility of foreign fluid ingress.

SUMMARY

One embodiment of the present application is a working fluid case that includes a housing and a breather device. The breather device includes a vent passage located in a recess formed in the housing. Other embodiments include unique methods, systems, devices, and apparatus to provide for aligning a lock chassis to an orientation and retaining an anti-rotation plate to the lock chassis. Further embodiments, forms, objects, aspects, benefits, features, and advantages of the present application shall become apparent from the description and figures provided herewith.

BRIEF DESCRIPTION OF THE FIGURES

Features of the application will be better understood from the following detailed description when considered in reference to the accompanying drawings, in which.

DETAILED DESCRIPTION OF REPRESENTATIVE EMBODIMENTS

Figure 1:
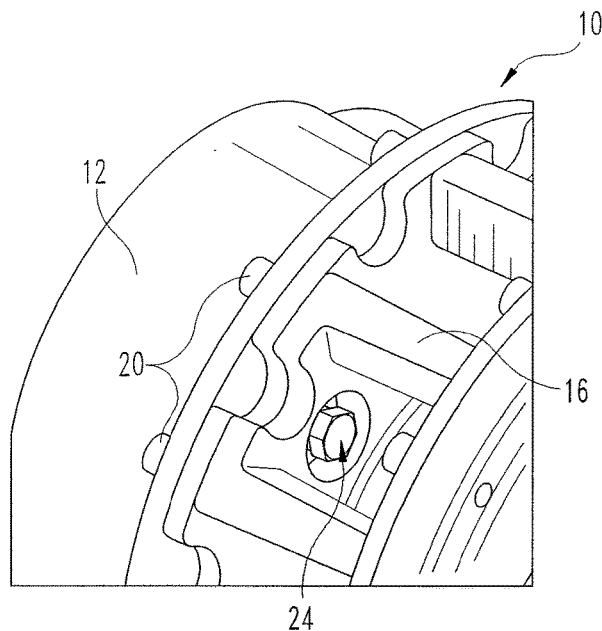
FIG. 1 is a partial perspective view of a working fluid case according to an embodiment.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein, are contemplated as would normally occur to one skilled in the art to which the invention relates.

Turning to the figures, FIG. 1 shows a working fluid case 10 according to an embodiment. The working fluid case 10 includes a fluid reservoir housing 12 that stores a working fluid such as oil or the like. The fluid reservoir housing 12 may be connected to a mating housing 16, for example as shown, and held together via suitable fasteners 20. In an embodiment, working fluid case 10 takes the form of a truck blower that incorporates two shafts arranged parallel to one another, and the fluid reservoir housing 12 functions as an oil tank within which a gear train is provided, and the mating housing 16 houses bearings associated with the gear train.

Figure 2:
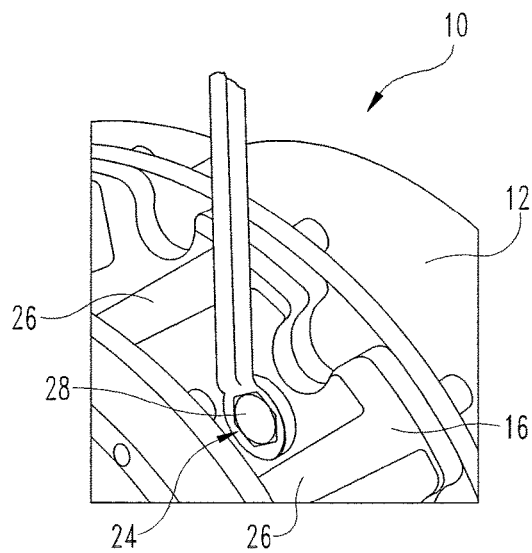
FIG. 2 is a perspective view of the FIG. 1 case, showing a tool accessing a breather device of the case.
Figure 3:
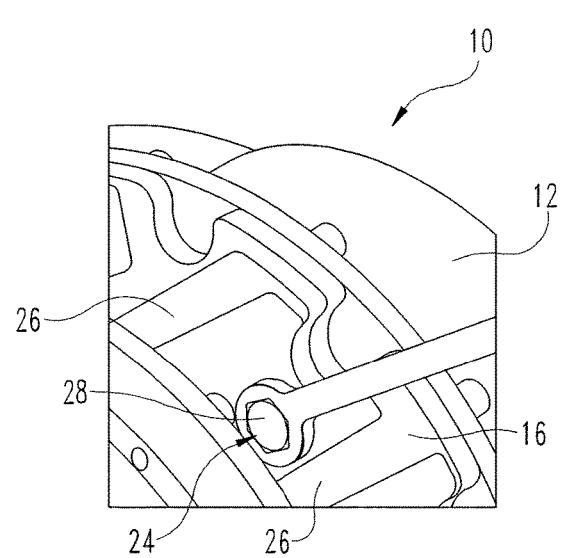
FIG. 3 is a perspective view of the FIG. 1 case, showing a tool accessing a breather device of the case.

The working fluid case 10 further includes a breather device 24. As shown in the embodiment of FIGS. 1-3, the breather device 24 may be positioned radially inward of the outer circumference of the mating housing 16 of the fluid reservoir housing 12. In the truck blower form, the breather device 24 may be placed at an angle of 45 degrees relative a plane that includes the parallel shafts. In one application, the breather device 24 may be disposed between circumferentially adjacent axially extending arms 26 of the mating housing 16. Referring to FIGS. 2 and 3, the breather device 24 may also include a head 28 that is easily accessible for example by a standard closed or open end wrench or the like.

Figure 4:
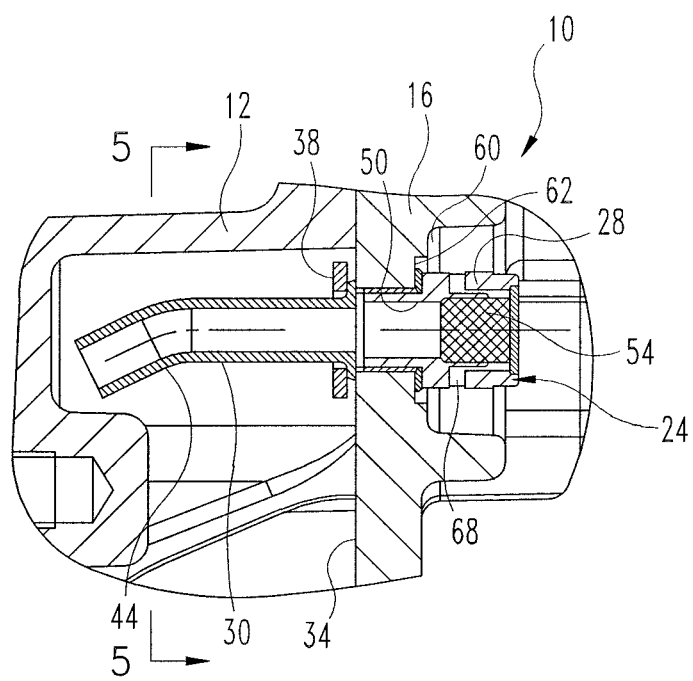
FIG. 4 is a partial cross-sectional view of the FIG. 1 case showing details of the case in the vicinity of the breather device.
Figure 5:
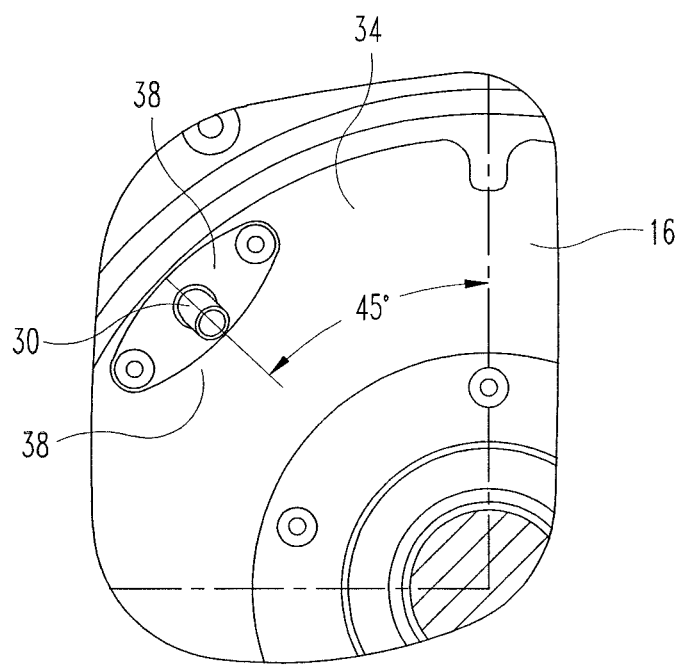
FIG. 5 is an end elevational view from within the FIG. 1 case of a connection for a breather pipe, taken at elevation 5-5 of FIG. 4.

FIG. 4 shows a cross-sectional view of the working fluid case 10, particularly the breather device 24 thereof. FIG. 5 shows the breather device 24 from the inside of the fluid reservoir housing 12. The breather device 24 may have an internal pipe or tube 30 or similar hollow member that assists in preventing splashed working fluid or working fluid dust inside of the working fluid case 10 from escaping to the outside of the breather device 24 and more generally the working fluid case 10. The pipe 30 is arranged in such a manner that working fluid that splashes from the fluid reservoir housing 12 into the pipe 30 drains back into the fluid reservoir housing 12. As shown in FIGS. 4 and 5, the pipe 30 may be fastened to a flange 34 or other wall member of the mating housing 16 via for example a clamp and screw arrangement 38 or the like. As shown in FIG. 4, the pipe 30 may have a bend portion 44 that projects radially inward toward the central axis of the working fluid case 10. As shown in FIG. 5, the bend portion 44 may be aligned about the central axis of the working fluid case 10 at an angle of for example 45 degrees, to facilitate for example drain off of trapped working fluid splashed into the pipe, in either a horizontal or vertical orientation operation of the working fluid case 10.

Referring to FIG. 4, the breather device 24 may define therein a cavity 50, which in the illustrated embodiment is a cylindrical shape cavity extending axially from a top wall 52 of the head 28 to the upstream end of the pipe 30 in the fluid reservoir housing 12. A filter element 54 such as a metal mesh or the like may be fitted within the head 28 portion of the cavity 50.

The head 28 of the breather device 24 is seated in a recess 58 formed in the mating housing 16 of the working fluid case 10. The recess 58 may be formed for example by one or more countersinks and/or counterbores cast or machined into the mating housing 16 for example as shown at reference numerals 60 and 62. As shown in FIG. 4, inside the head 28, at diametric opposite ends of the cavity 50 there may be provided a pair of vent holes 68. The vent holes 56 may be located within the recess 58 formed in the mating housing 16.

Any theory, mechanism of operation, proof, or finding stated herein is meant to further enhance understanding of embodiment of the present invention and is not intended to make the present invention in any way dependent upon such theory, mechanism of operation, proof, or finding. In reading the claims, it is intended that when words such as "a," "an," "at least one," or "at least one portion" are used there is no intention to limit the claim to only one item unless specifically stated to the contrary in the claim. Further, when the language "at least a portion" and/or "a portion" is used the item can include a portion and/or the entire item unless specifically stated to the contrary.

While embodiments of the invention have been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein of by any of the following claims are desired to be protected. It should also be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow.

What is claimed is:

1. A truck blower comprising:
   a mating bearing housing including two shafts arranged parallel to one another;
   a fluid reservoir housing connected to the mating bearing housing; and
   a breather device placed at an angle of 45 degrees relative to the plane defined by the two parallel shafts, the breathing device including at least one vent passage that is located within a recess formed in the mating bearing housing and is in fluid communication with the inside of the fluid reservoir housing.

2. The truck blower according to claim 1 in which the breather device includes a screw having a head that defines a cavity therein in fluid communication with the at least one vent passage.

3. The truck blower according to claim 2 in which the cavity has a cylindrical shape.

4. The truck blower according to claim 3 in which the at least one vent passage projects radially from the cylindrical cavity.

5. The truck blower according to claim 1 in which the recess comprises a counterbore in the housing.

6. The truck blower according to claim 1 in which the at least one vent passage is substantially S shape.

7. The truck blower according to claim 6 in which the at least one vent passage comprises a pair of vent holes at diametric opposite ends of the cylindrical shape cavity.

8. The truck blower according to claim 5 in which the head is configured to be accessible by a closed or open ended wrench.

9. The truck blower according to claim 4 comprising a filter element fitted in the cavity of the head.

10. A truck blower case comprising:
    a mating bearing housing;
    a fluid reservoir housing connected to the mating bearing housing; and
    a breather device that includes a hollow member inside the fluid reservoir housing and in fluid communication with a recess formed in the mating bearing housing.

11. The truck blower case according to claim 10 in which an upstream portion of the hollow member is in fluid communication with the inside of the fluid reservoir housing and a downstream end of the hollow member is fastened to a flange of the mating bearing housing.

12. The truck blower case according to claim 10 in which the breather device includes a head portion having at least one vent passage located within the recess formed in the mating bearing housing.

13. The truck blower case according to claim 12 in which a cavity in fluid communication with the at least one vent passage extends axially from a top of the head portion to an upstream end of the hollow member in the fluid reservoir housing.

14. The truck blower case according to claim 10 in which the hollow member has a bend portion that projects radially inward toward a central axis of the truck blower case.

15. The truck blower case according to claim 14 in which the bend portion is aligned about a central axis of the working fluid case at an angle to facilitate drain off of fluid splashed into the hollow member in either a horizontal or vertical orientation operation of the working fluid case.

16. The truck blower case according to claim 15 in which the angle is 45 degrees.

17. A truck blower comprising:
    an oil tank housing in which a gear train is provided;
    a bearing housing that houses bearings associated with the gear train, the bearing housing being fastened to the oil tank housing and having a through passage and a counterbore passage larger than the through passage; and
    a breather device that includes a body portion fastened to the through passage and a head portion seated within the counterbore passage, the body portion and the head portion defining a cylindrical cavity therein in fluid communication with the inside of the oil tank housing, and wherein the head portion has at least one breather hole that extends from a periphery of the cylindrical cavity to the counterbore passage.

18. The truck blower according to claim 17 in which the breather device is positioned between axially extending arms of the bearing housing.

19. The truck blower according to claim 17 in which the breather device includes means for preventing splashed working fluid inside of the oil tank housing from escaping to the outside of the breather device.

20. The truck blower according to claim 19 in which the means comprises a tube in fluid communication with the cylindrical cavity and having a bend portion that projects radially inward toward a central axis of the truck blower.

* * * * *